(12) United States Patent
Kulak et al.

(10) Patent No.: US 12,422,388 B2
(45) Date of Patent: Sep. 23, 2025

(54) MEASURING DEVICE

(71) Applicant: TUSAS-TURK HAVACILIK VE UZAY SANAYII ANONIM SIRKETI, Ankara (TR)

(72) Inventors: Furkan Kulak, Ankara (TR); Deger Akin, Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 428 days.

(21) Appl. No.: 18/009,888

(22) PCT Filed: Mar. 30, 2021

(86) PCT No.: PCT/TR2021/050284
§ 371 (c)(1),
(2) Date: Dec. 12, 2022

(87) PCT Pub. No.: WO2022/005417
PCT Pub. Date: Jan. 6, 2022

(65) Prior Publication Data
US 2023/0296542 A1    Sep. 21, 2023

(30) Foreign Application Priority Data
Jun. 30, 2020    (TR) .................................. 2020/10329

(51) Int. Cl.
*G01N 25/18*    (2006.01)
(52) U.S. Cl.
CPC .................................. *G01N 25/18* (2013.01)
(58) Field of Classification Search
CPC .................................................. G01N 25/18
See application file for complete search history.

(56) References Cited

U.S. PATENT DOCUMENTS

| | | | |
|---|---|---|---|
| 6,142,662 | A | 11/2000 | Narh et al. |
| 10,656,109 | B1 | 5/2020 | Fesmire et al. |

FOREIGN PATENT DOCUMENTS

| | | |
|---|---|---|
| CN | 102798645 A | 11/2012 |
| CN | 103364431 A | 10/2013 |

(Continued)

OTHER PUBLICATIONS

International Search Report and Written Opinion for PCT application No. PCT/TR2021/050284, mailed Jul. 28, 2021.

(Continued)

*Primary Examiner* — Mirellys Jagan
(74) *Attorney, Agent, or Firm* — Notaro, Michalos & Zaccaria P.C.

(57) ABSTRACT

A measuring device for measuring thermal contact resistance is disclosed. The device includes a body, a vacuum chamber on the body in which a thermal contact resistance measurement is conducted, a first sample and a second sample which are placed in the chamber and are in contact with each other in such a way that heat transfer occurs, a piston which ensures a continuous contact to take place between the first sample and the second sample during a measurement, a cooler which is located under the first sample and the second sample, at least one damper which is attached to the chamber, is located under the cooler, and enables to dampen the force applied by the piston to provide a continuous contact between the first sample and a second sample, an insulator disposed between the cooler and the damper, providing insulation for the heat transfer conducted by the cooler.

8 Claims, 1 Drawing Sheet

(56) References Cited

FOREIGN PATENT DOCUMENTS

| CN | 107782762 | A | * | 3/2018 | ............. G01N 25/20 |
| CN | 207764148 | U | | 8/2018 | |
| CN | 211577034 | U | * | 9/2020 | ................ G01J 5/00 |
| CN | 112129810 | A | * | 12/2020 | ............. G01N 25/20 |
| CN | 112229871 | A | * | 1/2021 | ............. G01N 25/20 |
| EP | 3557234 | B1 | * | 11/2023 | .......... G01M 99/002 |
| WO | WO-2020139253 | A1 | * | 7/2020 | ............. G01K 17/00 |
| WO | WO-2020139262 | A1 | * | 7/2020 | ............. G01N 25/18 |
| WO | WO-2020139266 | A1 | * | 7/2020 | ............. G01K 17/00 |
| WO | WO-2020139268 | A1 | * | 7/2020 | ............. G01N 25/18 |
| WO | WO-2020139273 | A1 | * | 7/2020 | ............. G01N 25/20 |

OTHER PUBLICATIONS

International Preliminary Report on Patentability, completed Sep. 14, 2022.

International Application Status Report generated Nov. 25, 2022.

Tariq, A., et al.; "Experimental investigation of thermal contact conductance for nominally flat metallic contact"; Heat and Mass Transfer 2015; 52(2):291-307.

Written Opinion of the International Preliminary Examining Authority dated Jun. 24, 2022.

Response to Written Opinion of the International Preliminary Examining Authority dated Aug. 8, 2022.

Demand/Request for Preliminary Examination dated Apr. 28, 2022.

\* cited by examiner

MEASURING DEVICE

FIELD OF THE INVENTION

This invention relates to a measuring device enabling the measurement of thermal contact resistance.

BACKGROUND

Honeycomb sandwich panels with carbon fiber reinforced plate surfaces are widely used, especially in space vehicle and air vehicle. Various equipment and components in space vehicle can be fixed directly to these panels, and the fixation process is carried out through supports. Equipment, components and/or supports fixed to these panels can be manufactured from metallic materials. For this reason, a precise determination of the thermal contact resistance formed by fixing the equipment, components and/or supports to said panels is important in the thermal control design of the space vehicle. When measuring thermal contact resistance, at least two samples are allowed to contact each other. Heat exchange takes place between the two samples. Meanwhile, thermal contact resistance is measured. This test takes place in an atmosphere where contact with air is excluded. A continuous contact of the two samples is achieved by a compressive force. The provision of continuous compressive force is performed by a piston of great power. In order to balance this compressive force, a damper must be present in the measurement arrangement. This will adversely affect the accuracy of the measurement as there may be a heat transition between this damper and the thermal surfaces. For this purpose, there is a need to put Teflon, an insulating material, between the damper and thermal surfaces. However, under the influence of piston force, damper or thermal surfaces cause deformation on the insulating material and lead to measurement errors while adversely affecting the life of the arrangement.

Chinese patent application document CN105548249 in the state of the art describes a measurement method having an apparatus that provides a point distribution of a load.

By virtue of a measuring device developed by the present invention, thermal contact resistance measurements, which are critical for space vehicle and air vehicle, are improved.

A further object of the present invention is to ensure that the developed measuring device is practical, effective, efficient and reliable and to extend its service life.

SUMMARY

The measuring device realized to achieve the object of the invention, as defined in the first claim and in the claims dependent on this claim, comprises a body, a chamber deaerated to conduct a thermal contact resistance measurement in the body, a first sample and a second sample staying in contact to conduct thermal contact resistance measurements in the chamber, a piston that helps the first sample and the second sample to contact each other, a cooler disposed in the chamber, at least one damper underneath the cooler, acting as a damper for damping the force exerted by the piston, an insulator disposed between the cooler and the damper to prevent heat loss.

The measuring device according to the invention comprises a plate positioned between the damper and the insulator, enabling the force to be distributed homogeneously so as to prevent the damper from deforming the insulator under the action of the piston force.

In an embodiment of the invention, the measuring device comprises a gap opened on the insulating material during or after its production, a plate placed in the gap to reduce the negative effect of the piston force on the insulator.

In an embodiment of the invention, the measuring device comprises more than one damper having an equal distance between them to reduce the negative effect of the piston force on the insulator, more than one plate having an equal distance between them, more than one gap having an equal distance between them.

In an embodiment of the invention, the measuring device comprises more than one damper with an asymmetrical distance between them, more than one plate with an asymmetrical distance between them, more than one gap with an asymmetrical distance between them.

In an embodiment of the invention, the measuring device comprises a sheet disposed between the insulator and the cooler, preventing the cooler from applying a force to the insulator under the influence of the piston force that would deteriorate the integrity of the insulator.

In an embodiment of the invention, the measuring device comprises a sheet disposed in the gap to reduce the negative effect of the piston force on the insulator via the cooler.

In an embodiment of the invention, the measuring device comprises an insulator formed using Teflon material.

In an embodiment of the invention, the measuring device comprises a plate formed using stainless steel material.

In an embodiment of the invention, the measuring device comprises a sheet formed using stainless steel material.

BRIEF DESCRIPTION OF THE DRAWINGS

The measuring device realized to achieve the object of the present invention is shown in the attached figures, wherein from these figures.

Figure 1:
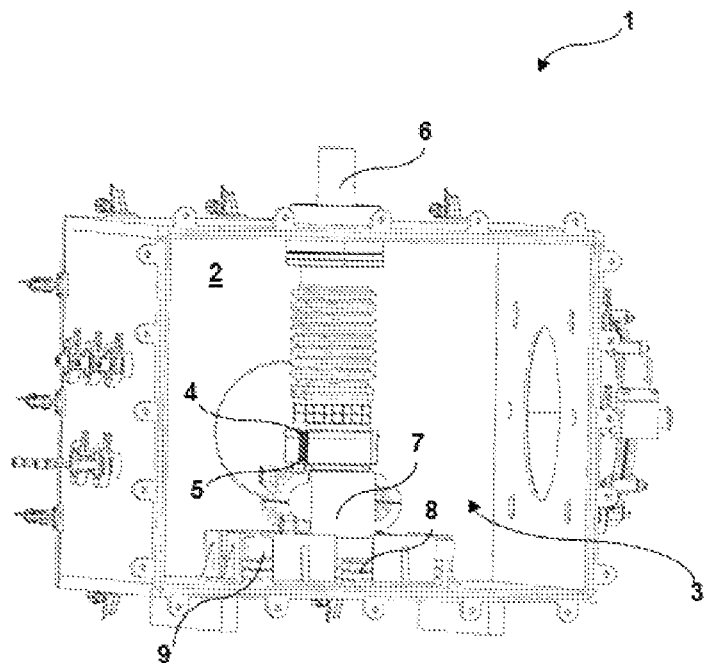
FIG. 1—is a measurement perspective view.

The parts in the figures are individually numbered and the equivalent of these numbers is given below.

1—Measuring device
2—Body
3—Chamber
4—First sample
5—Second sample
6—Piston
7—Cooler
8—Damper
9—Insulator
10—Plate
11—Gap
12—Sheet

DETAILED DESCRIPTION

The measuring device (1) comprises a body (2), a vacuum chamber (3) on the body (2) in which a thermal contact resistance measurement is conducted, a first sample (4) and a second sample (5) which are placed in the chamber (3) and are in contact with each other in such a way that heat transfer occurs, a piston (6) which ensures a continuous contact between the first sample (4) and the second sample (5) during a measurement, a cooler (7) which is located under the first sample (4) and the second sample (5), at least one damper (8) which is attached to the chamber (3), is located under the cooler (7), and enables to absorb the force applied by the piston (6) to provide a continuous contact between the first sample (4) and a second sample (5), an insulator (9)

disposed between the cooler (7) and the damper (8), providing insulation for the heat transfer conducted by the cooler (7). (FIG. 1)

Figure 2:
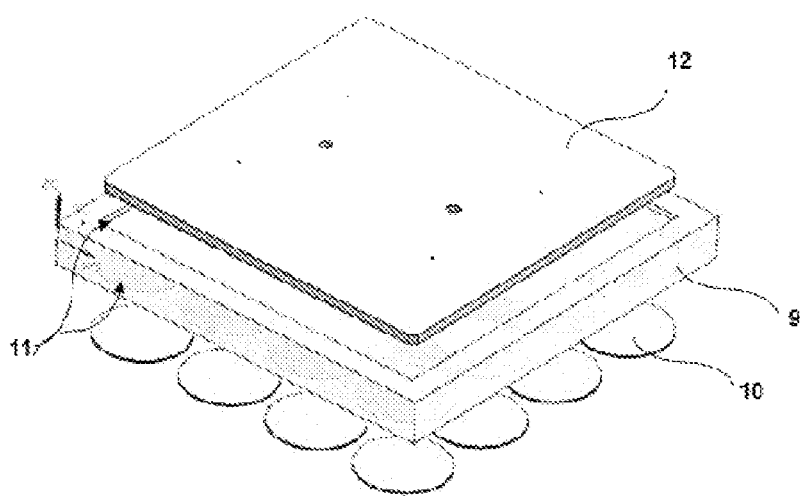
FIG. 2—is a perspective view of plate, sheet, insulator.

The measuring device (1) according to the invention comprises at least one plate (10) between the damper (8) and the insulator (9), preventing deformation on the insulator (9) by homogeneously distributing the force exerted by the damper (8) on the insulator (9). (FIG. 2)

By virtue of the vacuum chamber (3), a test arrangement independent of outdoor conditions is created. While measuring the thermal contact resistance of the first sample (4) and the second sample (5), a force is applied by the piston (6) to the first sample (4) and the second sample (5) to maintain the contact between them. While measuring the thermal contact resistances of the first sample (4) and the second sample (5), a heat flow is created by means of the cooler (7). The force applied by the piston (6) is dampened by the damper (8) to keep the measuring device (1) in balance. An insulator (9) is disposed between the cooler (7) and the damper (8) to prevent the damper (8) from generating heat loss. In this way, the thermal contact resistance measurements of the first sample (4) and the second sample (5) to be used in the production of parts in space vehicle and air vehicle are carried out in such a way that the error rate is reduced.

On the insulator (9), a plate (10) is placed between the insulator (9) and the damper (8) to prevent any deformation by the damper (8) due to the force applied by the piston (6). In this way, the force applied by the piston (6) is spread homogeneously to prevent deformation on the insulator (9). Thus, a safe, easy-to-use measurement is performed while the accuracy of the thermal contact resistance measurements of the first sample (4) and the second sample (5) to be used in the production of parts in space vehicle and air vehicle increases.

In an embodiment of the invention, the measuring device (1) comprises at least one gap (11) disposed on the insulator (9) and the location of which is determined by the user, and a plate (10) placed in the gap (11) to homogeneously spread the force exerted by the damper (8) on the insulator (9). The plate (10) is placed in the gap (11) provided in the insulator. In this way, the force applied by the piston (6) is spread homogeneously and the deformation to occur on the insulator (9) is reduced and safety is enhanced. (FIG. 2)

In an embodiment of the invention, the measuring device (1) comprises more than one damper (8), more than one plate (10) and more than one gap (11) disposed at equal distances to each other to homogeneously spread the force exerted by the damper (8) on the insulator (9) when the force exerted by the piston (6) is dampened. In this way, the force applied by the piston (6) is spread homogeneously to prevent deformation on the insulator (9). (FIG. 2)

In an embodiment of the invention, the measuring device (1) comprises more than one damper (8), more than one plate (10) and more than one gap (11) disposed at different distances to each other. Thus, the damper (8), plate (10) and gap (11) are positioned in such a way that the force applied by the piston (6) is spread homogeneously.

In one embodiment of the invention, the measuring device (1) comprises at least one plate (10) positioned between the cooler (7) and the insulator (9) to prevent deformation on the insulator (9) while the force exerted by the piston (6) is dampened. This prevents the cooler (7) from deforming the insulator (9) under the force applied by the piston (6). Thus, a safe, easy-to-use measurement is performed while the accuracy of the thermal contact resistance measurements of the first sample (4) and the second sample (5) to be used in the production of parts in space vehicle and air vehicle increases. (FIG. 2)

In an embodiment of the invention, the measuring device (1) comprises a sheet (12) placed in user-designated gap (11) on the insulator (9) to prevent deformation by homogeneously spreading the force exerted by the cooler (7) on the insulator (9).

Thus, any deformation on the insulator (9) by the force applied by the piston (6) is prevented.

In an embodiment of the present invention, the measuring device (1) comprises an insulator (9) produced from Teflon. Teflon material is the most suitable material for this process in terms of insulation and durability. Thus, the risk of deformation on the insulator (9) is reduced.

In one embodiment of the invention, the measuring device (1) comprises a plate (10) made of stainless steel. The plate (10) placed between the insulator (9) and the damper (8) is expected to provide durability and homogeneous load distribution. Stainless steel material is used for this purpose. Thus, the risk of deformation on the insulator (9) is reduced.

In an embodiment of the invention, the measuring device (1) comprises a sheet (12) produced from stainless steel. The plate (10) placed between the insulator (9) and the damper (8) is expected to provide durability and homogeneous load distribution. Stainless steel material is used for this purpose. Thus, the risk of deformation on the insulator (9) is reduced.

By virtue of the measuring device (1) developed by the present invention, a measuring device (1) is obtained that performs thermal contact resistance measurements, which are of critical importance for space vehicle and air vehicle, in a practical, effective, efficient and reliable manner by preventing those deformations that are expected to occur on the insulator (9).

The invention claimed is:
1. A measuring device (1) comprising
a body (2),
a vacuum chamber (3) in the body (2) in which a thermal contact resistance measurement is conducted,
a first sample (4) and a second sample (5) which are placed in the chamber (3) and are in contact with each other in such a way that heat transfer occurs,
a piston (6) which ensures a continuous contact to take place between the first sample (4) and the second sample (5) during a measurement,
a cooler (7) which is located under the first sample (4) and the second sample (5),
at least one damper (8), which is attached to the chamber (3), is located under the cooler (7), and enables to dampen a force applied by the piston (6) to provide the continuous contact between the first sample (4) and the second sample (5), and
an insulator (9) disposed between the cooler (7) and the damper (8), providing insulation for heat transfer conducted by the cooler (7),
wherein:
at least one plate (10) is placed between the damper (8) and the insulator (9) to prevent deformation of the insulator (9) by homogeneously distributing a force exerted by the damper (8) on the insulator (9),
at least one gap (11) is provided on the insulator (9) and of which the location is determined by a user, and
the at least one plate (10) is placed in the gap (11) to homogeneously distribute the force exerted by the damper (8) on the insulator (9).

2. A measuring device (1) according to claim 1, comprising more than one damper (8), more than one plate (10) and more than one gap (11) disposed at equal distances to each other to homogeneously distribute the force exerted by the damper (8) to the insulator (9) when the force applied by the piston (6) is dampened.

3. A measuring device (1) according to claim 1, comprising more than one damper (8), more than one plate (10) and more than one gap (11) disposed at different distances to each other.

4. A measuring device (1) according to claim 1, wherein the insulator (9) is produced from Teflon.

5. A measuring device (1) according to claim 1, wherein at least one of the at least one plate (10) is made of stainless steel.

6. A measuring device (1) according to claim 1, comprising at least one sheet (12) placed between the cooler (7) and the insulator (9) for preventing any deformation from occurring on the insulator (9) when the force applied by the piston (6) is dampened.

7. A measuring device (1) according to claim 6, wherein the sheet (12) is disposed in the gap (11) on the insulator (9) to prevent deformation by homogeneously distributing a force exerted by the cooler (7) on the insulator (9).

8. A measuring device (1) according to claim 6, wherein each sheet (12) is made of stainless steel.

\* \* \* \* \*